(12) United States Patent
Su et al.

(10) Patent No.: US 6,643,646 B2
(45) Date of Patent: Nov. 4, 2003

(54) ANALYSIS OF MASSIVE DATA ACCUMULATIONS USING PATIENT RULE INDUCTION METHOD AND ON-LINE ANALYTICAL PROCESSING

(75) Inventors: Hua-Ching Su, Milpitas, CA (US); Taiki Sakata, Sunnyvale, CA (US); Charles Herman, Dublin, CA (US); Steven Dolins, Highland Park, IL (US)

(73) Assignee: Hitachi, Ltd., Tokyo (JP)

( * ) Notice: Subject to any disclaimer, the term of this patent is extended or adjusted under 35 U.S.C. 154(b) by 264 days.

(21) Appl. No.: 09/797,752

(22) Filed: Mar. 1, 2001

(65) Prior Publication Data

US 2002/0124002 A1 Sep. 5, 2002

(51) Int. Cl.[7] ............................................. G06F 17/30
(52) U.S. Cl. ........................................................ 707/6
(58) Field of Search ............................ 707/6, 3, 5, 100, 707/1

(56) References Cited

U.S. PATENT DOCUMENTS

| | | | |
|---|---|---|---|
| 5,251,126 A | * 10/1993 | Kahn et al. | 600/309 |
| 5,577,169 A | * 11/1996 | Prezioso | 706/52 |
| 5,819,266 A | 10/1998 | Agrawal et al. | |
| 5,842,200 A | 11/1998 | Agrawal et al. | |
| 5,943,667 A | 8/1999 | Aggarwal et al. | |
| 5,983,224 A | 11/1999 | Singh et al. | |
| 5,987,470 A | 11/1999 | Meyers et al. | |
| 6,055,539 A | 4/2000 | Singh et al. | |
| 6,134,541 A | 10/2000 | Castelli et al. | |
| 6,154,739 A | * 11/2000 | Wrobel | 707/6 |
| 6,173,280 B1 | 1/2001 | Ramkumar et al. | |
| 6,266,668 B1 | * 7/2001 | Vanderveldt et al. | 707/10 |
| 6,418,427 B1 | * 7/2002 | Egilsson et al. | 707/2 |

OTHER PUBLICATIONS

Jerome H. Friedman & Nicholas I. Fisher, Bump Hunting in High–Dimensional Data, Oct. 28, 1998.

* cited by examiner

*Primary Examiner*—Safet Metjahic
*Assistant Examiner*—Sana Al-Hashemi
(74) *Attorney, Agent, or Firm*—Townsend and Townsend and Crew LLP

(57) ABSTRACT

A method of analyzing data contained in a very large database or data warehouse includes applying first a patient rule induction method with selected input variables and an output variable to develop a region containing a subset of database records having a highest average output value. Then, the subset of records may be aggregated, sorted, compared, or new measures computed, preferably using an on line analytical processing function, for an pattern analysis of the subset records. An alternative is to apply a weighted item set function to the subset to produce a reduced subset, and then applying the reduced subset to on line analytical processing for pattern analysis.

11 Claims, 2 Drawing Sheets

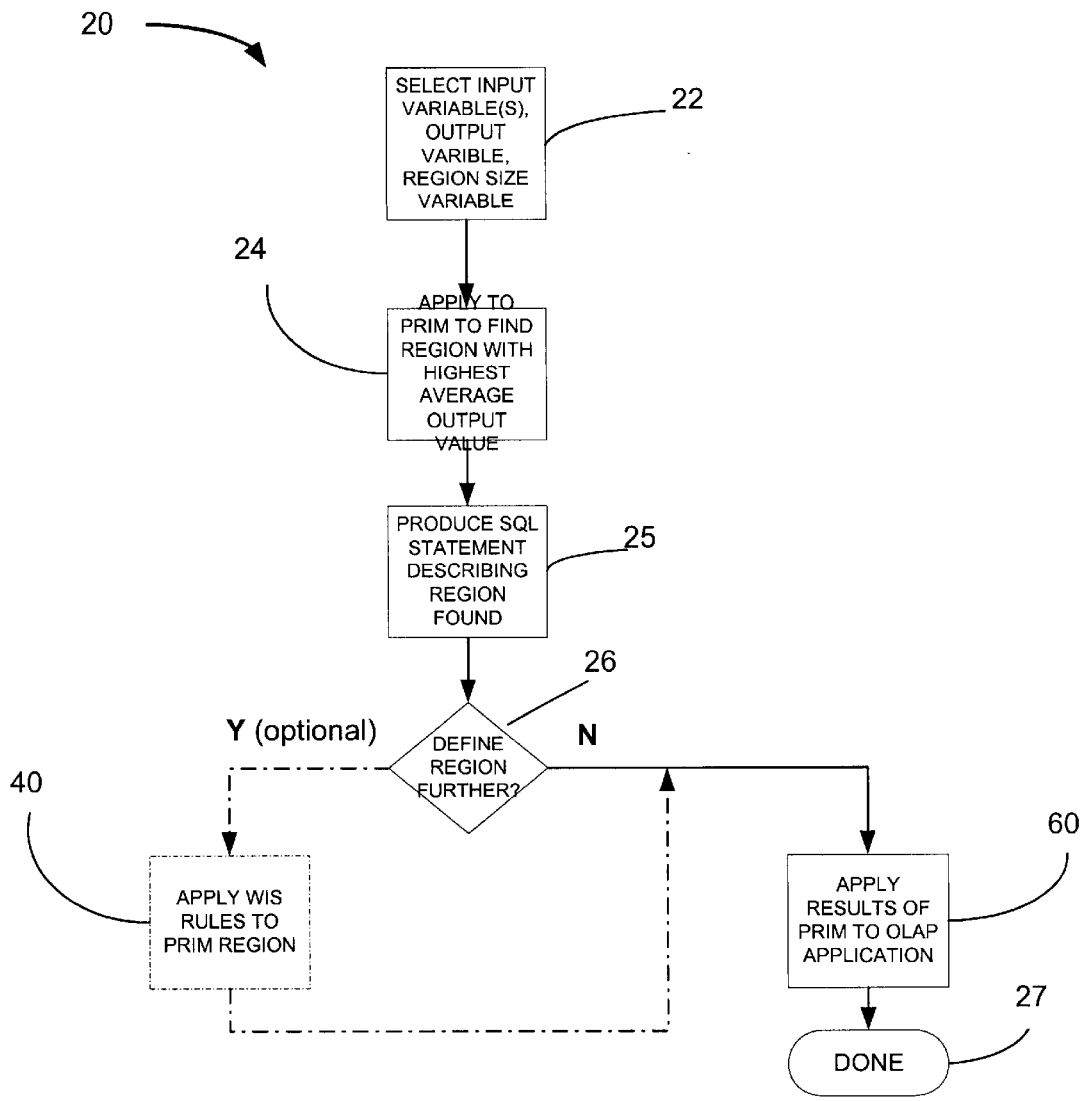
FIG_1
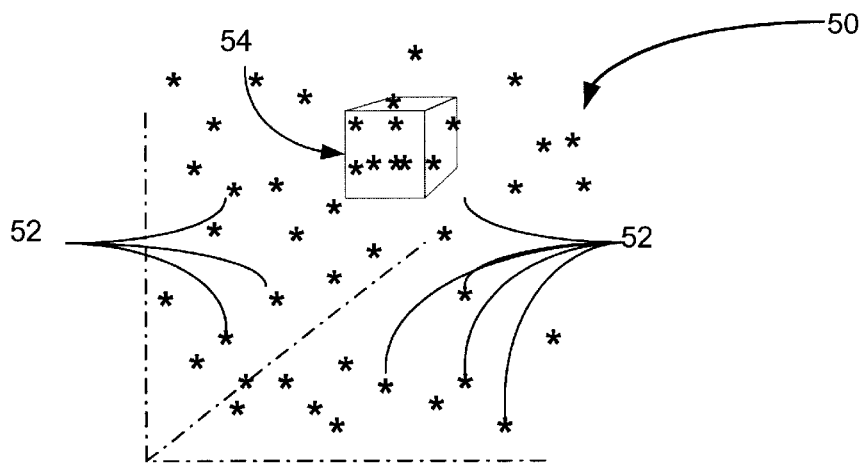
FIG_2

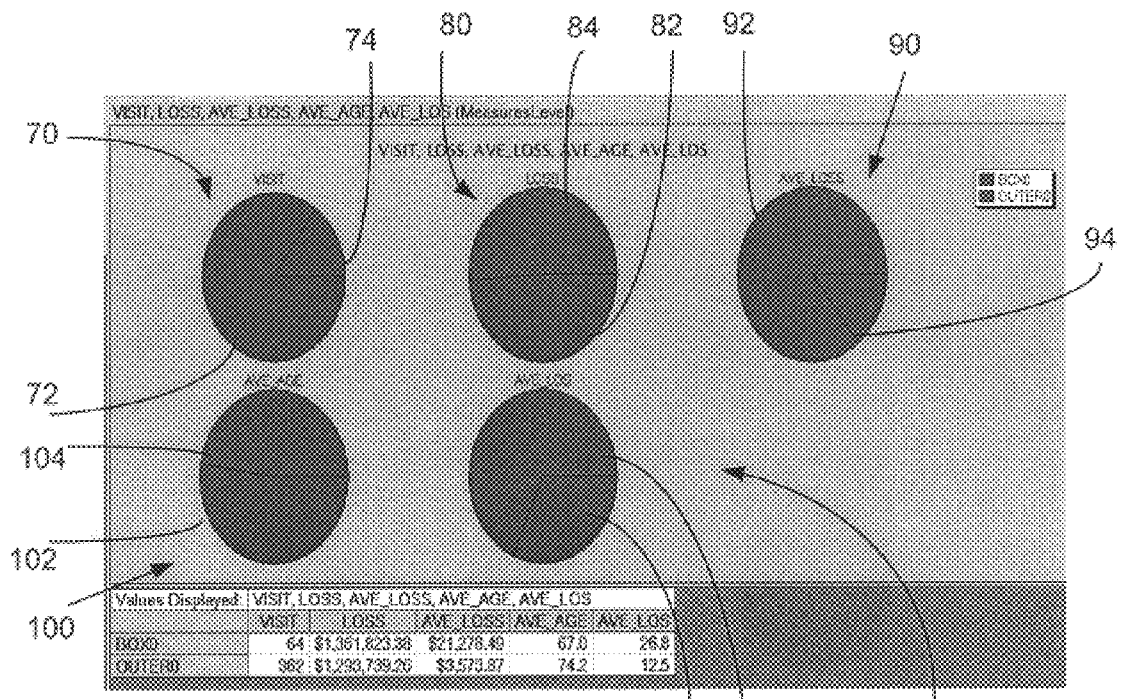
FIG_3
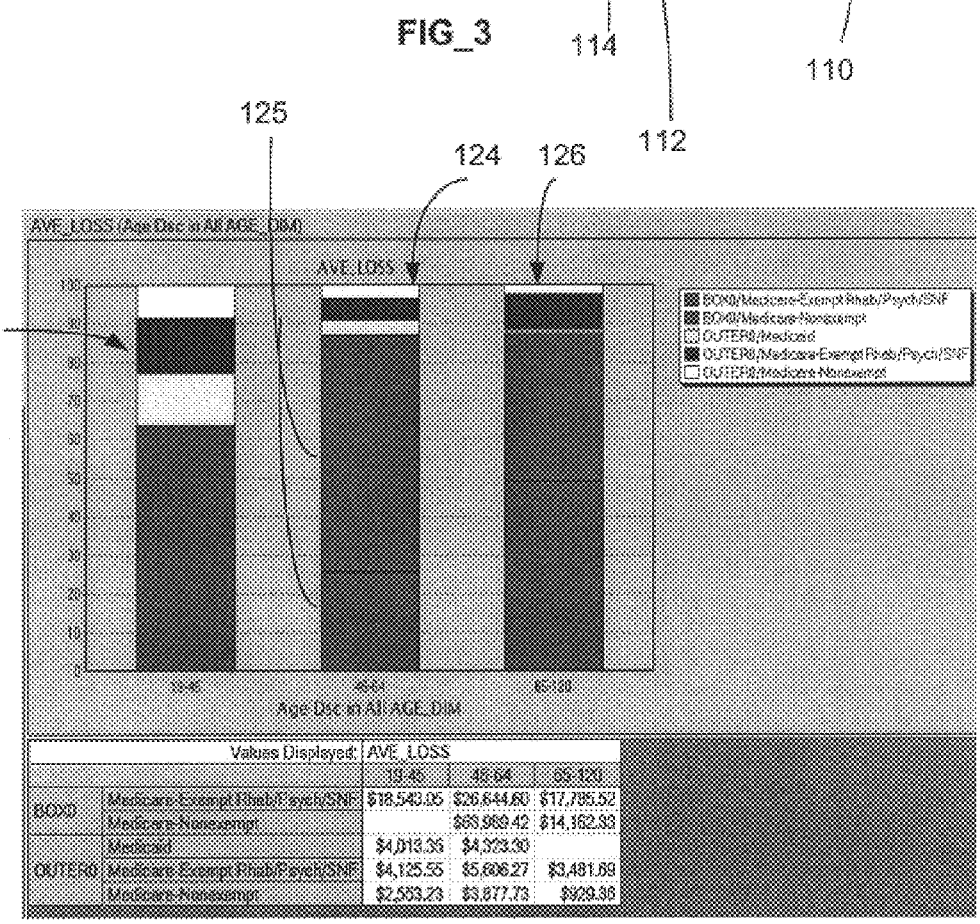
FIG_4

ANALYSIS OF MASSIVE DATA ACCUMULATIONS USING PATIENT RULE INDUCTION METHOD AND ON-LINE ANALYTICAL PROCESSING

REFERENCE TO A COMPUTER PROGRAM LISTING APPENDIX SUBMITTED ON A COMPACT DISK

Incorporate herein by reference is material stored on a compact disc consisting of a single file tiled "application Ser. No. 09797,752 Appendix A.txt", having a size of 36 Kbytes, having a creation date of Apr. 11, 2003. The material is source code for PRIM and WIS applications, written in the JavaScript scripting language.

BACKGROUND OF THE INVENTION

The present invention is related to the general field of database processing and in particular is directed to analysis, interpretation and comparison of data of large databases or data warehouse environments. Specifically, a major objective of the invention is to provide a method for automatically and efficiently interpreting such data.

Recent years has seen a proliferation of data collection. Due in large part to the growth of use of computers in every facet of the business world, massive amounts of data can now be assembled and maintained in very large databases and data warehouses. (A data warehouse is collection of data designed to support management decision making together with a database system for maintaining the data, and systems for extracting desired portions of the data.) Unfortunately, as capable as today's computing technology may be at gathering, organizing, and maintaining such large accumulations of data, they fail miserably at being able to process and analyze such massive amounts of data. This inability to be able to unearth and pull relevant business insights, interesting patterns, and like observations from large quantities of data makes collecting such data less useful. Even searching such databases and data warehouses for relevant relationships in an effort to gain some insight into and observations about buying patterns, for example, can be a daunting task due not only to the huge amounts data available for review and analysis, but also to the lack of capability available to today's search technology.

There are available today tools and techniques, e.g., association rules designed to find relationships between millions of database records, to assist business and data analysts gain a better understanding of their data. But, it is not intuitive or obvious as to how an analysis of such a large amount of data should be focused, what new knowledge should be extracted from the database, or how to then interpret and evaluate this new knowledge.

Among the tools available are those employing various "data mining." algorithms that operate to sift through a large database or data warehouse in an effort to locate patterns. Data mining techniques typically classify and/or cluster data, find associations between data items, or perform time series analysis. (See, for example, Agrawal, R. et al., In *Advances in Knowledge Discovery and Data Mining*, AAAI/MIT Press, Ch 12:307–328 (1996); Ashok Sarasere et al., In *21st Int'l Conf on Very Large Databases (VLDB)*, Zurich, Switzerland (September 1995). For example, a data mining technique may be used to sift through a database maintained by a retail outlet for records relating to expensive purchases in an effort to market to a specific customer segment. However, use of data mining tools requires careful selection of search variables in order to obtain meaningful data and/or data relationships. Lack of a key variable in a search can result in an output that may be incorrectly interpreted, or just undecipherable.

One data mining technique, termed the "Patient Rule Induction Method" or "PRIM," is structured to find a high average region within a very large collection of data records. Typically, a data record will consist of variables. To employ PRIM, a user selects certain of the variables to form a set of input variables and one output variable. The user will also select a minimum size of the desired region. The selected variables and region size are then input to PRIM. PRIM then finds regions where the output variable has a high average value compared to the average value for the entire set of records. PRIM could also be used to find regions with minimum average value by maximizing the negative values of the output variable. The region found by PRIM is defined by a subset of attribute values. For an analytical description of PRIM and the algorithms it employs, see Friedman, J. et al., *Statistics and Computing*, 9:2, pp. 123–143 (April 1999).

Another data mining tool is Weighted Item Sets (WIS), a type of association rule. This tool finds relationships between various attributes in a database; some of the attributes can be derived measures. The relationships are defined in terms of if-then rules that show the frequency of records appearing in the database that satisfies the rule. An example of WIS can be found in U.S. Pat. No. 5,173,280.

Another analysis tool for databases or data warehouses with massive amounts of data items or records is the On-line Analytical Processing ("OLAP") technique. A number of commercially available products have been built to employ this technique, e.g., Cognos' Enterprise OLAP and PowerPlay, Business Objects Inc.'s Business Objects, Informix's MetaCube, Platinum's InfoBeacon, MicroStrategy's DSS Agent, Oracle's Express, etc. All of these products offer similar functionality.

OLAP typically includes the following kinds of analyses: simple (view one or more measures which can be sorted and totaled), comparison or cross-tab (view one measure and sort or total based upon two dimensions), trend (view a measure over time), variance (compare one measure at different times such as sales and sales a year ago), and ranking (top 10 or bottom 10 products sold) [Peterson, T. et al., SAMS Publishing (1999)]. OLAP enables users to drill down within a dimension to see more detailed data at various levels of aggregation.

Users can also filter data with the OLAP technique, i.e., focus their analysis on a subset of records in the database. For example, if a user is interacting with a retail chain store database then he/she may only be interested in "West Coast" stores. Users need to know which attribute or attributes they want to set-up filter conditions. Users also need to know how to define the filtering conditions; OLAP enables users to filter records based upon only arithmetic conditions of one or more database attributes or a "where" clause in a SQL statement.

In addition to the analysis tools and techniques described above, there is also what is known as the Knowledge Discovery in Databases (KDD) Process. KDD and data mining conferences have been held since 1989. This new field has produced a widely followed and accepted KDD process, capable of selecting data, pre-processing or editing data, transforming data, performing data mining, and evaluating/interpreting the findings. See Fayyad, U. et al., "The KDD Process for Extracting Useful Knowledge from Volumes of Data," *Communications of the ACM* 39, 11, pp. 27–34 (November 1996). The KDD process is "The nontrivial process of identifying valid, novel, potentially useful, and ultimately understandable patterns in data." (Fayyad, U. et al., *supra*.) This process assumes that a knowledge engineer or domain expert will evaluate and interpret the findings.

There is a recent trend in the industry to integrate data mining techniques with OLAP tools. See, for example, "OLAP Vendors Increasingly See Data Mining Integration as Potent Differentiator", http://www.idagroup.com/v2n0701.html; "OLAP and Data Mining: Bridging the Gap", http://www.dbpd.com/vault/parsfeb.html. The purpose of the integration of these tools is to give analysts the flexibility to choose whether to use OLAP to view and aggregate data, or data mining techniques to better analyze attributes. Users can use these tools in any combination.

There are limitations to this integration approach. Typically, these tools are packaged in a software product, but little or no guidance is given to users on how they should use the tools in conjunction with one another. These tools solve different types of problems so it is difficult to use them to support one another. Also, these tools do not always present results in an easy to understand manner. For example, a user can look at a WIS rule or PRIM region definition and understand the attributes and values. However, users may miss the meaning of the pattern or an explanation for its occurrence. That is, a user cannot easily look at a SQL statement describing a PRIM region and intuitively understand the differences between the high average region and the other data points or outer region.

Some combinations of these tools do not make sense. For example, OLAP tools cannot discover high average regions or find new patterns in data.

SUMMARY OF THE INVENTION

The method of the present invention integrates two technologies for massive database analysis: one for finding an optimized region, consisting of a subsets of records in a database, and a second for analyzing, interpreting, and evaluating the subset of records and/or newly identified facts. (Hereinafter, "database" will be understood to include both database structures, as well as data warehouse implementations.)

Broadly, the invention employs a data mining technique to first search the entire database for a region containing database records in which a pre-selected attribute has a high average value. This region will comprise a subset of database records that are characterized by ranges of values for some feature or set of features, i.e., columns in a relational table, often referred to as attributes. These characteristics about database records are sometimes called patterns, i.e., patterns that are common to the subset of records found. Next, the database records of the region found are further examined by, for example, aggregating, sorting, comparing, and computing new measures, e.g., variance between two columns. The subset of records found by the data-mining step can be compared to the remaining records, i.e., those records not satisfying the newly found pattern(s). Also, the region's subset of records can be compared to the entire set of records. One embodiment of the invention makes use of operation of on line analytical processing (OLAP), although other tools for making such analysis may also be used.

In a specific embodiment of the invention, the Patient Rule Induction Method ("PRIM") process is used to develop the region, using predetermined attributes of the database records as inputs and a selected one of the attributes as the output. PRIM can be structured to produce an SQL statement that describes the region found by its operation. This SQL statement can then be applied to an OLAP or OLAP-like application for focussed analysis.

The unique combination of PRIM and a comparison tool, such as OLAP, enables efficient searching of records in the database to find patterns, then a detailed analysis on the subset of records defined by the patterns.

In a further embodiment of the invention, the product of the data-mining operation, i.e., the region found, can then be applied to an association rule tool to identify particular associations between the records of the region. In this embodiment the Weighted Item Sets (WIS) is utilized to find relationships between various attributes in the records of the region.

The method of this invention can be thought of as a three-step approach for applying these techniques, where each technique's strength is utilized for a specific purpose.

The first step of the method is to use PRIM to find regions in the database. PRIM finds regions with high average values for an output variable. The boundaries of the region define a subset of database records that satisfy algorithmically computed criteria.

The second and third steps of the method are to use the results of PRIM and WIS, i.e., the subset of records, for input for a more detailed analysis of the various database record attributes. That is, we start with a region discovered by PRIM and possibly a subregion discovered by WIS. OLAP can be used to interpret, evaluate, and compare the subset of data. In the third step, OLAP is used to compare points in the region to data points outside of the region. In the fourth step, OLAP is used to compare the region to the entire data population.

In the alternate embodiment of the invention, the first step of using PRIM may be followed by a second step of running WIS on the PRIM region, i.e., find associations between attributes for the records in the high average region. Then, the OLAP application operates on the sub-region found by WIS, forming steps three and four of this alternate method.

The use of PRIM with OLAP operates to complement one another. PRIM finds an optimized region, i.e., a subset of data points, and OLAP can graphically display aggregated values for various dimensions for the region and points outside of the region, i.e., the outer region. After running PRIM, OLAP can be applied to graphically display data for both the region and outer region.

Based upon the data mining results, OLAP compares data points in a region to data points outside of a region. An OLAP report could be run on all dimensions, e.g., all input variables used in PRIM. Even new measures could be defined for the OLAP analysis. Based upon the OLAP results, further OLAP reports can be run to drill down on interesting dimensions.

For the alternative use WIS unearths patterns, i.e., associations between attributes. In the case of WIS, the region is not an optimized region but a region made of records satisfying the criteria in the rule. For WIS, the patterns are represented by rules, where each rule describes a region that consists of data points satisfying the rule's conditions.

The present invention differs from earlier attempts to combine data mining techniques, because the data mining technique selected for this invention, PRIM, has not been applied in this manner, i.e., no other tools have been used in conjunction with PRIM. The invention employs a specific series of steps for applying data mining and OLAP. In the first step, PRIM is specifically used to find a region for analysis. Any other technique that finds an interesting region, i.e., a region with records that can be compared to records outside of the region or to the entire population, can be applied. WIS may also be used to identify a subregion, i.e., a subset of records, on the region found by PRIM.

The present invention has advantages not heretofore achieved by the prior art, because the output of the first step of this method helps users determine which subset of records to analyze further and focus on. OLAP can filter records, but not based upon statistical evidence or algorithmic computations. For example, OLAP is capable of finding a particular percentage of records having a selected attribute with a high value, but it cannot find a percentage of records with that attribute and also having some other common attribute values in a multi-dimensional space.

The invention provides an improvement over prior art analysis method in that it partially automates the KDD process to perform data mining and evaluate the results using a specific three-step (or, alternatively, a four-step) method. The partial automation is that the region from the first step can be represented by a SQL statement that can be used by OLAP to retrieve data. Then OLAP can be used to evaluate the rules. The improvement is that subsets of records are further analyzed and compared to the remaining records, i.e., those not identified by the rules.

BRIEF DESCRIPTION OF THE DRAWINGS

FIG. 1 is a flow diagram illustrating the major steps used for analyzing large and massive databases and/or data warehouses according to the method of the present invention;

FIG. 2 is a diagrammatic representation of a database or data warehouse multidimensional space, showing the representations of individual records located with the space according to the attributes of the record, and also showing a representation of a region found by the initial steps of the flow diagram of FIG. 1; and FIGS. 3 and 4 are illustrations of graphical information as might be presented at the conclusion of the method outlined by the flow diagram of FIG. 1.

DESCRIPTION OF THE SPECIFIC EMBODIMENTS

An overview of the invention is shown generally by the flow chart of FIG. 1, which broadly identifies the major steps of the invention. Generally, the method of the invention: or method has three steps:
1) First find an interesting region, represented by facts/rules.
2) Perform detailed analysis of the region using OLAP, including comparing subset of records with remaining records in the population. OLAP can be used to compare the highest average region and/or a sub-region.
3) Perform a second detailed analysis on the region using OLAP, including comparing subset of records with the entire population of records. OLAP can be used to compare the highest average region and/or a sub-region.

The order of steps 2 and 3 is unimportant and either step is optional.

An optional step, following step 1, and before step 2, is to find interesting rules describing the region.

The following paragraphs walk through each of these four steps. Then a specific example will be given to further explain the invention.

Step 1. Data Mining:
Referring for the moment to FIG. 1, there is a flow chart 20 broadly illustrating the major steps of the invention. Initially, the database is prepared for data mining. For the first step of this method, PRIM is preferred. PRIM finds a region, i.e. a subset of database records, represented by "rules", i.e., criteria to filter or select subsets of records. Rules can also be defined as SQL statements, which define subsets of records.

When using PRIM in the first step, the following information is input by the user in step 22:

A set of attributes from database table(s) is selected and/or defined by the user for the purpose of analysis (step 22). This set of input variables will be used to describe the subset of records found by PRIM.

An output variable is also selected in step 22. The output variable is a numerical attribute directly in the database or computed/derived from the database table(s), with a fully additive property. With this property, the output variable can be summed and an average computed for any set of records.

Both the input variables and the output variable are selected by the user and these selections form a definition of a case to be studied by PRIM. Then, in step 25, Alpha and beta values are parameters for PRIM to find the target subset of records. These Alpha and Beta variables are:

Alpha—controls how fast the algorithm finds the region with highest average value.

Beta—constrains the minimum size of the region to be found, that is the minimum support for the region to be found. PRIM will find the region with the size that is at least as big as beta.

In step 25, the PRIM algorithm will first read the entire data set from text files into a computer memory, and then starts the computation process to find target subset of records, which is often referred to as the target box, or a hyper rectangle. The entire data set is conceptualized as a large multi-dimensional box. In each iteration step, the following actions are performed:
1. Compute hyper rectangle:
    1.1 Simulate peeling of the big box for each n beta values to provide users a hint to which beta to select for its corresponding high average value. The output of this phase is beta graphs for average values and number of records for the corresponding beta value.
    1.2 User choose beta value based on the result of the beta graph.
    1.3 Compute hyper rectangle that results from peeling and pasting.
    1.4 Successively expand on the next best attribute, until the box average stops increasing. For each iteration, a hyper rectangle is obtained.
    1.5 For hyper rectangle, choose a hyper rectangle among all those found. Input from user: a hyper rectangle id.
2. Remove points in hyper rectangle from data set.
3. If necessary compute other hyper rectangles (same as in step 1.)
4. Save hyper rectangles to a file.
5. Visualize hyper rectangle (optional).
6. Save the boundaries of hyper rectangles to a database to allow further integration with other tools and query the boxes for detail analysis.

For input variables, both continuous and categorical variables are handled. But each kind is handled differently. For continuous variables, PRIM produces bounds, i.e., minimum and maximum. For categorical variables, PRIM produces subsets of categorical values.

7. Display both hyper rectangles as in relational table format on screen and generate a SQL statement; an example will be shown hereinafter.

The SQL statement represents the region or subset of points in the data population with the highest average value for the output variable found by PRIM.

Digressing for the moment, the database in question for which the present invention was developed, will typically contain a massive amount of data records, each data record including a number of attributes. This is shown in FIG. 2, which broadly illustrates a multidimensional database space 50 in which the data records of the database are represented as the points 52. FIG. 2 illustrates only a three-dimension space in order to deep from unduly complicating this discussion. However, it will be apparent to those skilled in this art that more likely the space 52 will be n-dimensional, each dimension corresponding to an attribute of the data records. The position of each data record 52 within the database space 50 is determined by its attributes. PRIM operates on the database space 50 to find the region 54 within the space 50 and containing those database records 52 having the highest average value for the selected output variable.

Having now located those database records of interest in step 25, step 26 determines whether (optionally) further data mining is desired, or whether to proceed to a detailed analysis of the region 54 is to be performed, using OLAP (step 60). Assuming further data mining is desired, step 26 is left in favor of step 27 where the results of the data mining developed by PRIM, i.e., the description of the region in terms of an SQL statement, is supplied to a WIS algorithm.

Optional Step 2—WIS:

WIS can be employed to analyze the highest average region developed by the steps 22–25 of data mining. WIS also finds a region, i.e., a subset of records or a sub-region of the region found by PRIM.

WIS finds associations between items in the database. These associations take the form of if-then rules, along with corresponding statistics. An example of a situation to which WIS can be applied is a retailer's sales database. The records in the database are transactions, that is, all the items a customer purchases during one visit to the store. The type of rules we are searching for is, if a customer purchases bread and butter, that customer is highly likely to also purchase milk.

The generic notation A→B is used to mean if A holds then B holds. Both A and B can be compound, i.e., A can take the form 'bread and butter'.

Most association rule techniques use support as the criterion for pruning rules. Support is the fraction of records that contain both A and B. This support criterion ignores any additional value an item has. Going back to the retail example, we might want to give more weight to high priced items than to low priced items—after all, selling a few high priced items might be considered equivalent to selling many low priced items.

Input for WIS consists of two files and two parameters. The two files are:

A data file, which contains a line for each transaction. This line consists of all items that make up the transaction.

A descriptor file, which consists of one line for each item contained in the data file. This line has a full text label for the item, followed by its associated weight.

Both files may be derived from the SQL statement developed in step 25 by conventional software algorithms.

The two parameters, which are used to prune rules, are:

Minimum Weighted Support—Weighted Support is the fraction of records that contain both A and B multiplied by the weight of the rule. The weight of the rule is the sum of the weights of all the items in the rule.

Minimum Conviction—Conviction is a measure of the statistical correlation between A and B. We want this value to be high.

Other statistics displayed by the program include:

Confidence—The fraction of records for which A holds, for which B also holds.

Lift—A measure of the surprise the rule impacts. Suppose we know the fraction of records for which B holds—the probability of B. The lift measures the additional information we get about the probability of B once we know the record contains A.

WIS outputs a list of all the rules it extracted from the transactions in the data file, which satisfy the Minimum Weighted Support and Minimum Conviction criteria. For each rule the output also displays all its associated statistics.

In order to easily tie in to the OLAP step 60 (described below), this output can take one of two forms:

A verbose form, which has the form "If bread and butter then milk", along with the associated statistics. This form is meant to be human readable.

A stylized form, which describes the items in a fashion making it easier to generate a SQL statement. This SQL statement will extract all records in the database that satisfy the rule.

To automate the SQL generation process, association rules are stored in the database to provide various ways of querying the association rules.

Again, the SQL statement defines a sub-region or a subset of database records in the population of all database records of the database under investigation. The population analyzed could be the sub-region found by PRIM in the first step, or it WIS could be used in the first step to develop the region applied to OLAP.

Steps 3 and 4—OLAP:

Step 60 (FIG. 1) includes the third and fourth steps of the method, which is the application of either the PRIM region developed in step 25, or the subset of the PRIM region as developed by WIS in step 60, involves a detailed analysis by the OLAP application. Accordingly, the SQL statement describing the region provided by PRIM in step 25, or by WIS in step 40, made available in order to create a table or tables for OLAP tools. One of several approaches can be used: 1) A new table can be created in the relational database and all records meeting the SQL criteria can be inserted in this table; or, 2) a new dimension, which represents the records in the sub-region, can be created; or, 3) the SQL statement can be converted to the MDX query language, a query language used with Microsoft OLAP services, and a subset of a cube can be created from a cube representing the entire data population. 4) Create a view representing the sub-region.

There can be at least three types of data set-up for the OLAP tool. First, of course, will be the data describing those database records contained within the PRIM region 54 (FIG. 2), or the WIS sub-set of the region 54 found by step 40. Then, there can be those database records that reside outside the PRIM region (or WIS sub-set). And, there can be those database records that form the entire database population. With this data, OLAP can be used for analysis. The analysis looks at dimensions, i.e., attributes, and compares the regions.

For example in the healthcare domain, the following set of data can be applied to an OLAP analyses:

Visit volume by patient sex

Visit volume and average charge by Length of Stay (LOS)

Visit volume by surgeon department

Average LOS by surgeon department

The list above is only a partial list of the set of pre-defined analyses that can be performed on the subset of records found in step 26 of FIG. 1, the remainder of patients (those not found in step 26), and all patients. These analyses are defined based upon the attributes in the database. These analyses can be pre-defined, i.e., defined before step 26 is executed. These analyses can be automatically generated based upon the results from step 26. Only the analyses deemed important, i.e., based upon PRIM results, need to be run.

As an example of the method of the present invention, PRIM was applied to in-patient fact data maintained by a health care database This was information about patients who actually stayed over one or more nights in the hospital. In this example, only Medicare and Medicaid patient visits were analyzed, and only in-patients visits during a one-year period, with a specific diagnostic code that was unprofitable. This resulted in a group containing approximately 426 patients. This total number of patient visits did not include a small number of inpatient visits where payment was not yet received at the time of the study.

Using PRIM "losses" can be used as an output variable. Input variables can be the age of a patient (age), time of admission (adm_tm), an admission source code such as the location of admittance (adm_src_cd), admission type code (adm_typ_cd), time of discharge (dsch_tm), type of discharge (dsch_typ_cd), nursing station code (nurs_sta_cd), hospital source code (hosp_srvc_cd), operating unit minimum routine identification (opunt_min_rtn_id), operating unit maximum routine identification (opunt_max_rtn_id), length of stay quantity in terms of how long the patient stayed in a hospital bed (los_qty), diagnosis identification (drg_id), admitting physician identification (md_adm_id), attending physician identification (md_att_id), patient type code (pt_typ_cd), financial (insurer) code (fin_cls_cd), total charges (tot_chrg_amt), total cost (tot_cost_amt), total payments (tot_pymt_amt), total adjustments (tot_adj_amt), patient marital status (martl_sts_cd), patient zip code (zip_cd), payer (insurer) code (payr_cd), network code (ntwrk_cd), and various medical codes used by payer/insurers (icd9_diag1_cd, icd9_proc1_cd, and md_proc1_id).

Alpha can be set to 0.05, and Beta set to 0.1. The resulting output is a region or a subset of records that had the highest average losses found by PRIM. The output is a set of conditions on the input attributes, which define the region (subset). Those conditions are used to generate a SQL statement, which can be used to find the subset of records making up the region.

In this example, a SQL statement given below represents the region found by PRIM.

SELECT * FROM PRIMPARTBL_30 WHERE
AND AGE>=29
AND AGE<=90
AND LOS_QTY >=7
AND LOS_QTY <=54
AND TOT_CHRG_AMT >=10347.18
AND TOT_CHRG AMT <=86792.81
AND ADM_SRC_CD IN ('EO', 'RA', 'RP', 'TH', 'TO')
AND ADM_TYP_CD IN ('R', 'X')
AND DSCH_TYP_CD IN ('7Z', 'HR', 'TH', 'TI', 'TP', 'TR', 'TW')
AND FIN_CLS_CD IN ('J', 'M', 'P')
AND ICD9_DIAG1_CD IN ('######', 'V58.49', 'V58.89')
AND ICD9_PROC1_CD IN ('######', '37.23', '39.95', '57.32', '92.29', '93.11', '93.81', '93.83')
["######" is used here to indicate that the "icd 9" codes are unknown.]
AND MARTL_STS_CD IN ('D', 'M', 'S', 'W')
AND MD_ADM_ID IN ('-1', '277', '421', '601', '667', '690', '707', '720', '1328', '1417', '1677', '1941', '1968', '2755', '60029', '60257', '61152', '61160', '61236', '61246', '61793', '61858', '67180', '67193', '67201', 67210', '68253', '68292', '68363')
AND MD_PROC1_ID IN ('-1', '277', '421', '501', '601', '667', '690', '707', '720', '1328', '1417', '1693', '1941', '1968', '2468', '60189', '60257', '60942', '61152', '61160', '61236', '61246', '61793', '61858', '66715', '67180', '67201', '68253', '68292', '68363')
AND NURS_STA_CD IN ('B5N', 'B5S', 'B6N', 'B6S', 'B7S')
AND OPUNT_MAX_RTN_ID IN ('426', '429', '431', '449')
AND OPUNT_MIN_RTN_ID IN ('426', '429', '431', '449')
AND ZIP_CDIN('60030', '60077', '60091', '60126', '60163', '60187', '60452', '60463', '60525', '60540', '60607', '60608', '60609', '60612', '60615', '60619', '60624', '60628', '60630', '60634', '60636', '60638', '60640', '60643', '60650', '60651', '60652', '60653', '60656', '60659', '60714')

After running PRIM, the region was found to consist of 64 in-patient visits. This makes up 15% of the inpatient visits. However, these visits made up more than half of the total losses associated with these inpatient visits. The average loss associated with the inpatient visits in the region was seven times larger than the inpatient visits outside the region, i.e., the outer region. The average length of stay for the inpatient visits in the region was two times larger than the outer region.

After PRIM successfully finds the high average region, a comparison between the high average region with the outer region may be made. This can provide information explaining why these patient visits had greater losses.

Thus, based upon PRIM's findings, OLAP was applied to perform a further analysis. Microsoft OLAP Services (a product of Microsoft Corporation of Redmond Wash.) was used for the multi-dimensional database server and ProClarity application (a product of Knosys, Inc. of Boise Id.) to do the reporting, i.e., display grids and graph. This is illustrated by the pie chart representations shown in FIG. 3.

Referring to FIG. 3, the pie chart 70 illustrates that when compared to the outer group 72 (i.e., those in-patient visits not included in the region found by PRIM), those patients of the group found by PRIM (pie section 74) as being relatively small, yet as the chart 80 illustrates, this group (pie section 84), incurred the most losses as compared with the outer region (pie section 82). Pie chart 90 shows the average loss of the outer group (pie section 92) as compare with the average loss of the PRIM group (pie section 94). Pie charts 100 and 110 respectively show the PRIM region (pie sections 104 and 114) relative to the outer regions (pie sections 102 and 112).

Numerous OLAP reports can be run on the attributes of the PRIM region, e.g., financial class, marital status of patients, age, etc. The report on financial class broke down the losses by the following categories: Medicare-Exempt Rhab/Psych/SNF, Medicare-Nonexempt, and Medicaid. Medicare-exempt Rhab/Psych/SNF had large and comparable losses in the region and outside of the region but the average loss was significantly larger in the region, i.e., almost seven times larger.

The report on age (FIG. 4) showed that inpatients between the ages of 46 and 64 (bar sections 125 of bar chart 124) had significantly larger losses than the rest of the patients in the region. They also had significant larger losses than the patients outside of the region. Based upon these results, it was decided to better understand why patients between the ages of 46 and 64 had poor financial performance. A follow-up OLAP analysis was performed that investigated admission source.

In addition to the OLAP product offered by Microsoft Corporation through its Microsoft OLAP Services, there are OLAP applications also offered by MicroStrategy, Inc., 8000 Towers Crescent Drive, Vieuna, Va. ("DSS Agent" a registered trademark of MicroStrategy), Cognos Corp. of 67 South Bedford Stree, Burlington, Mass. 01803 under the "PowerPlay" trademark (a registered trademark of Cognos Corp.), and Oracle of 500 Oracle Parkway Redwood Shores, Calif. 94065 under the "Oracle Express".

In conclusion, there has been disclosed a method for analyzing databases and data warehouses that contain massive amounts of data (data records). The present invention can be used to better focus analysis of such large databases and data warehouses on important regions. Using data mining algorithms, facts and/or a subset of database records are found meeting some statistical or algorithmic criteria. Then a detailed analysis can look at the subset of records to further interpret the results. The data records developed by the data mining algorithms can be compared to the remainder of the records in the database. The process proposed by the present invention will allow managers who are not skilled in data mining techniques to view data produced by a business in a format that will allow one to use their domain expertise to ask additional questions or develop defensible arguments for change.

While a complete disclosure of the invention has been made, and an example given for the health care industry, it will be obvious to those skilled in this art that the invention finds advantage in other environments. For example, other applications of this invention can include insurance, banking, consumer packaged goods, marketing, and like concerns that have a need for assembling, maintaining, and analyzing massive amounts of data.

What is claimed is:

1. A method for analyzing data included in a database, the data being in the form of a plurality of records each containing a number of variables, the method including the steps of:
   selecting a set of the number of variables as an input set and another of the number of variables as an output variable;
   producing a subset of said plurality of records having a high average value for the output variable with matching input variables, the subset being suitable for processing by the on-line an analytical function; and
   applying the on-line analytical processing function to the subset of said plurality of records and the plurality of records to compare the records outside those of the subset to the records of the subset.

2. The method of claim 1, wherein the applying step includes the step of comparing each of the records of the subset to the plurality of records.

3. The method of claim 1, wherein the applying step includes the steps of:
   creating a table in a relational database; and
   storing the subset of said plurality of records in the table.

4. The method of claim 1, wherein the producing step includes the step of providing predetermined rules for locating average values of the output variable according to the set of input variables.

5. The method do claim 1, wherein the applying step includes the step of first applying a weighted item set algorithm to the subset to produce a reduced subset of records, a d then applying the on line analytical processing function to the reduced subset.

6. A method of analyzing a massive collection of data records, each data recording having a plurality of attributes, including the steps of:
   selecting first ones of the attributes as inputs to a Patient Rule Induction Method application;
   then designating an output attribute and a minimum region size and additional inputs to the Patient Rule Induction Method;
   producing from the Patient Rule Induction Method a region within the collection of data records defined by a subset of attribute values;
   applying the subset of attribute values to an on line analytical processing function to compare the data records outside those of the subset to the data records contained within the subset.

7. A method for analyzing data included in a database, the data being in the form of a plurality of records each containing a number of variables, the method including the steps of:
   selecting a set of the number of variables as an input set and another of the number of variables as an output variable;
   producing a subset of said plurality of records having a high average value for the output variable wit matching input variables, the subset being suitable for processing by an on line a analytical processing function; and
   comparing the data records outside the subset to the data records contained within the subset.

8. The method of claim 7, wherein the comparing step includes applying the subset of records to the on line analytical processing function to com are the data records outside those of the subset to the data records contained within the subset.

9. The method of claim 7, wherein the producing step includes applying a weight d item set function to the subset to produce a reduced subset, and comparing step for pattern analysis.

10. The method of claim 1, wherein the producing step includes creating a SQL (structured query language) statement that can be processed by the on-line processing function.

11. The method of claim 7, wherein the producing step includes creating a SQL (structured Query Language) statement that can be processed by the on-line processing function.

* * * * *